United States Patent [19]

Säufferer

[11] 3,934,183

[45] Jan. 20, 1976

[54] LINEAR RELUCTANCE MOTOR FOR THE PROPULSION OF RAIL TRANSPORTATION MEANS

[75] Inventor: Helmut Säufferer, Esslingen, Germany

[73] Assignee: Daimler-Benz Aktiengesellschaft, Germany

[22] Filed: Jan. 21, 1974

[21] Appl. No.: 434,968

Related U.S. Application Data

[63] Continuation-in-part of Ser. No. 200,088, Nov. 18, 1971, abandoned.

[30] Foreign Application Priority Data

Nov. 18, 1970 Germany............................ 2056674

[52] U.S. Cl. ............ 318/135; 310/12; 104/148 LM; 105/49
[51] Int. Cl. .......................................... H02k 41/02
[58] Field of Search............................ 318/135, 121; 310/12–14; 104/148, 148 LM; 105/99

[56] References Cited
UNITED STATES PATENTS

| 3,171,049 | 2/1965 | Jarret et al. | 310/168 |
| 3,225,228 | 12/1965 | Roshala | 310/12 |
| 3,456,136 | 7/1969 | Pierro | 310/12 |
| 3,575,650 | 4/1971 | Fengler | 318/135 |
| 3,594,622 | 7/1971 | Inagaki | 318/135 |
| 3,706,922 | 12/1972 | Inagaki | 318/135 |
| 3,707,924 | 1/1973 | Barthalon et al. | 310/12 X |
| 3,740,628 | 6/1973 | Inagaki et al. | 318/135 |

*Primary Examiner*—Donovan F. Duggan
*Attorney, Agent, or Firm*—Craig & Antonelli

[57] ABSTRACT

A linear reluctance motor for the drive of rail transportation means which includes a primary part whose coils are fed with a.c. power while its secondary part is constructed rail-like, is arranged parallel to the track and is fixedly installed on the ground; the secondary part is thereby in the form of a toothed rack of ferromagnetic material whereby the primary part produces a magnetic field traveling cyclically in a direction opposite the drive direction and cooperating with the toothed rack.

20 Claims, 4 Drawing Figures

LINEAR RELUCTANCE MOTOR FOR THE PROPULSION OF RAIL TRANSPORTATION MEANS

This application is a Continuation-in-Part application of Ser. No. 200,088, filed Nov. 18, 1971, now abandoned, the disclosure of which is herein incorporated by reference.

The present invention relates to a linear reluctance motor for the drive of rail transportation means, whose primary part having coils fed with impulses is arranged in the vehicle and whose secondary part, constructed rail-like, is arranged fixed on the ground and parallel to the track.

It is known that the heretofore customary wheel drives of rail vehicles become problematical at velocities above 300 km/h because the adherence of the wheels on the rails no longer suffices in order to transmit from the wheels to the rail the considerable driving forces required for the acceleration and for overcoming the vehicle air resistance. It has already been contemplated heretofore to utilize propeller drives or jet-propulsions for high-velocity rail vehicles. However, such solutions are disadvantageous by reason of the strong noise and exhaust-gas development and cannot be considered in particular along such lines in which tunnels have to be traversed.

The linear reluctance motor has already been recognized as that drive system which has the best chances to find application in connection with high-velocity rail vehicles of the future. The linear reluctance motor involves in practice a normal electric motor, cut up radially and developed in a plane, whose one part is extended corresponding to the length of the traveled track and is laid parallel to the track whereas the other part is fixedly arranged in the vehicle. The most economical solution resides in that the primary part traversed by current is fixedly arranged in the vehicle whereas the secondary part consisting in the simplest case of a metallic rail is secured between the rails and the ground.

The advantages of the linear electric motor in the vehicle propulsion or drive systems consist, on the one hand, in that the velocity is not limited by centrifugal forces and that, on the other hand, by reason of the elimination of transmissions and bearings, the motor is not subjected to wear. Additionally, the motor operates noiselessly, in vibration-free and produces no air pollution.

The present invention is concerned with the task to provide a linear reluctance motor of the aforementioned type with economic manufacture. Additionally, the traction and brake moment should possess a value corresponding to the requirements of a high-velocity rail vehicle.

As solution to the underlying problems, the present invention provides that the secondary part is a toothed rack of ferromagnetic material and that the primary part produces a magnetic field which travels cyclically opposite the drive direction and cooperates with the rack. The reluctance motor according to the present invention therefore operates similarly to the reluctance motor known as a rotary motor, wherein the rotor corresponds to the rack provided according to the present invention. The magnetic field produced by the primary part seeks to take along the rack so that by reason of the secure anchoring of the rack on the ground, the vehicle is displaced or moved in the opposite direction corresponding to the velocity of the traveling magnetic field. The traveling velocity of the magnetic field is to be matched to the respective vehicle velocity of the rail vehicle, which takes place appropriately by an automatic control of known construction. With changes in the velocity of the magnetic field traveling opposite the drive direction, for the purpose of acceleration or for the purpose of braking of the vehicle, the inertia masses to be moved or moved as well as other resistances are to be considered in such a manner that optimum acceleration and deceleration values are obtained.

Advantageously, the teeth and tooth gaps have the same dimensions in the longitudinal direction. With this construction it is appropriate that two double coils of the primary part each correspond in their effective width to the longitudinal dimension of a tooth or toothed gap. Preferably four double-coils are arranged altogether one behind the other so that respectively one tooth and one tooth gap are covered by coils.

A preferred embodiment of this invention provides that two double coils each, following one another are cyclically energized sequentially, and more particularly in such a manner that upon engagement of the energization of two double coils disposed one behind the other, the forwardly disposed double coil is disposed in the forward half of a tooth and the cyclically following double coil is disposed in the forward half of the tooth gap disposed therebehind, whereas during discontinuance of the energization the corresponding coils are essentially in alignment with a tooth.

In the linear reluctance motor according to the present invention, the driving powers can be increased relatively simply by a multiplication of the coils in the primary part. In other words, a larger number of teeth is simultaneously used therefore for the drive. Thus, a preferred embodiment provides that several double-coil groups-of-four are arranged one behind the other.

It is also possible according to the present invention that only the teeth consist of ferromagnetic material. The teeth can be mounted therefore on a support rail of any suitable material, for example, of plastic material or of concrete. A considerable cost decrease during the manufacture of the secondary part can be achieved thereby. Appropriately, the support rail made from suitable material is installed at first whereupon the teeth of ferromagnetic material are mounted in the desired arrangement.

An embodiment is preferred in particular, in which the teeth are stacked from magnetic sheet metal plates disposed parallel to the double coil axis, whereby each second sheet metal member is constructed narrower in such a manner that with respect to the pole surfaces periodic recesses exist in the side surfaces of the toothed rack. The magnetic plates are thereby also preferably aligned parallel to the longitudinal direction of the toothed rack.

This preferred embodiment means a magnetic dilution or attenuation of the rack teeth so that the magnetic energization of the coils can be chosen so high that the remaining magnetic circuit never becomes saturated and a maximum field strength prevails in the air gap where the force production takes place.

In the construction provided with magnetic dilution or thinning of the teeth, it is particularly appropriate if the teeth are made as separate structural parts and are mounted on a rail. The magnet sheet metal plates subsequently forming the teeth can be manufactured very easily in a rational mass production and can then be mounted by an automatically operating tool in an accurate arrangement on the pre-installed support rail.

The tooth thickness is selected according to the present invention sufficient in such a manner that the distance between tooth side surface and pole surfaces has a value sufficient for practical operation. In other words, it is important that the ratio of air gap to tooth thickness has as small as possible a value. With a predetermined thickness of the air gap, this ratio can be favorably influenced by increasing the tooth thickness.

The control of the coil energization takes place preferably pulse-like by means of high-power thyristors whereby a conventional feeler or sensor responding to the position of the primary part relative to the teeth controls the thyristors and thus assures for an automatic control. The pulses energize two double coils disposed one behind the other always at that instant and in that manner that a maximum force is transmitted onto the primary part in the direction of the drive.

A particular problem with high-velocity rail vehicles especially in transportation installations resides in a sufficiently rapid braking, especially at the highest velocities. This problem can be solved in a simple manner by the present invention in that a brake circuit of known construction is provided which energizes the coils of the primary part with the respectively prevailing velocity at such a rate and cycle that a maximum counterforce is produced.

The velocity control can advantageously take place by control of the pulse frequency or repetition rate by conventional means. In other words, the built-in automatic control system can be so influenced that by changing the pulse frequency or repetition rate the velocity is increased or decreased.

Accordingly, it is an object of the present invention to provide a linear reluctance motor for the drive of rail transportation means which avoids by simple means the aforementioned shortcomings and drawbacks encountered in the prior art.

Another object of the present invention resides in a propulsion system for rail vehicles which is independent of the problem of inadequate adhesion of the wheels on the rails to achieve very high velocities.

A further object of the present invention resides in a propulsion system for rail vehicles which does not produce any noises in the propulsion system nor pollute the atmospheric air by exhaust gases.

A further object of the present invention resides in a drive system for rail vehicles in which the maximum velocity is not limited by centrifugal forces and which minimizes wear and tear in the parts thereof by the elimination of gears and bearings.

Stil another object of the present invention resides in a linear reluctance motor for the propulsion of rail vehicles which operates noiselessly, vibration-free and without air pollution.

Another object of the present invention resides in a propulsion system for rail vehicles which can be economically mass-produced and possesses good efficiency while at the same time permitting relatively favorable traction and braking moments.

These and other objects, features and advantages of the present invention will become more apparent from the following description when taken in connection with the accompanying drawing which shows, for purposes of illustration only, one embodiment in accordance with the present invention, and wherein.

Figure 1:
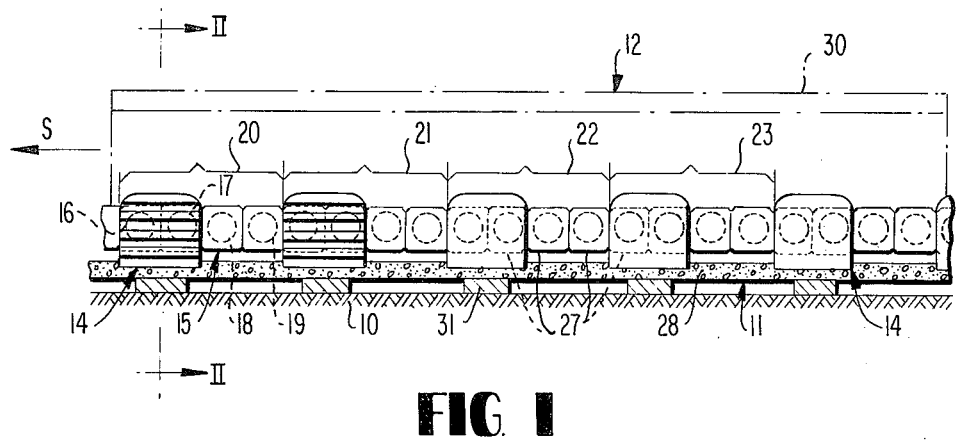
FIG. 1 is a schematic side view, partially in cross section, of a toothed rack of a linear reluctance motor according to the present invention whereby additionally one-half of the double coils and connecting members are indicated.

Referring now to the drawing wherein the like reference numerals are used throughout the two views to designate like parts, cross ties 31 are laid on the ground 10 on which are secured two rails 13. A toothed rack generally designated by reference numeral 11 is arranged according to the present invention between the rails 13, which consists of a support rail 28 and of teeth generally designated by reference numeral 14 arranged thereon at uniform spacings.

Figure 2:
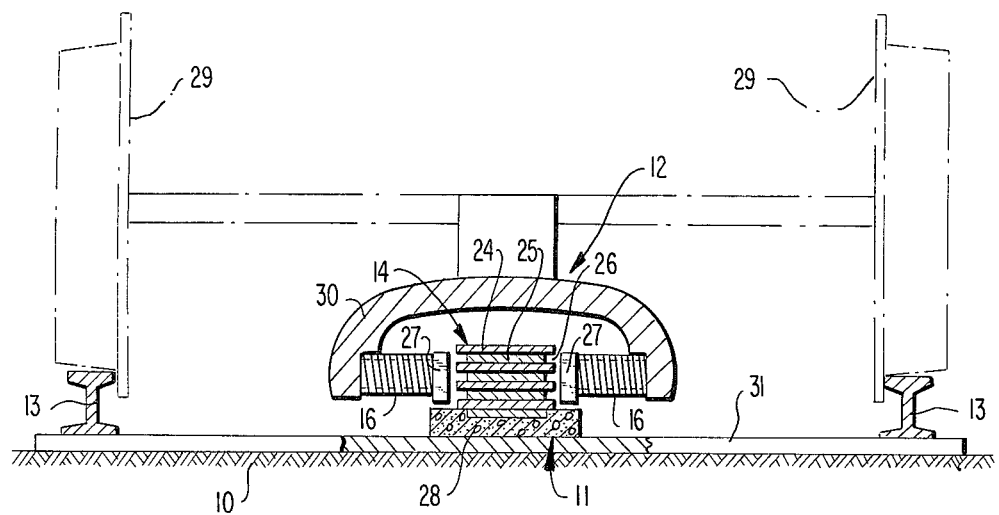
FIG. 2 is a cross-sectional view taken along Line II—II of FIG. 1 on an enlarged scale, whereby in addition to two wheels of a vehicle driven by the motor also associated rails on cross ties are indicated.

In FIG. 2, two wheels 29 of the rail vehicle are indicated in dash and dot lines which run on the rails 13. However, it should be mentioned that the drive system according to the present invention is suitable also for any other type of rail vehicles inclusive air cushion vehicles or magnetic cushion vehicles guided on rails.

The support rail 28 of the secondary part can be made from any suitable material which is particularly well-suited for a rational mass production and which takes into consideration the requirements for simple installation between the rails and form-rigidity also under extreme weather conditions. Particularly appropriate is the use of concrete.

The teeth 14 consist preferably of stacked magnetic sheet-metal members 24 and 25.

The teeth 14 consisting of stacked magnetic plates 24, 25 placed one on top of the other are secured in any suitable manner on the support rail 28. According to the present invention, the magnetic members 24 and 25 are aligned parallel to the ground and magnetic members 24 with larger width alternate with magnetic members 25 of smaller width. Periodic recesses 26 result therefrom in the side surfaces of the teeth 14, which bring about the magnetic thinning or dilution necessary for an economic operation. A magnetic attenuation or thinning can also be attained in that one inserts non-ferromagnetic materials between the magnetic members and thus increases the magnetic resistance of the teeth.

The primary part generally designated by reference numeral 12 which is secured at the vehicle consists of a series arrangement of double coils 16, 17, 18, 19, etc., of which the double coil 16 can be recognized in FIG. 2.

The curved connecting member 30 not only has to absorb the magnetic attraction forces but also must close the magnetic flux. Consequently, it must have a sufficient cross section and must therefore be made from a material of high rigidity as well as low magnetic resistance, i.e., high permeability.

An air gap is present between the pole surfaces 27 of the double coils and the side edges of the wider magnetic members 24, which on the one hand, is sufficiently small for producing the necessary propulsion force and on the other, has a sufficient width in order to satisfy the requirements of the practical operation. Appropriately the primary part 12 is arranged on the inside of the vehicle so as to be movable in a lateral direction, and an automatic device assures the maintenance of a predetermined width of the air gap. Since such control devices as will automatically maintain a predetermined width of the air gap are known as such and form no part of the present invention, a detailed description thereof as well as of the actuating means which produce any readjustment of the air gap, are dispensed with herein.

According to FIG. 1, the double coils are subdivided into groups-of-four 20, 21, 22 and 23. The teeth 14 and the tooth gaps 15 have the same dimensions in the longitudinal direction. The dimensions of each double coil in the longitudinal direction corresponds to half a tooth length.

The energization of the individual coils takes place pulse-like preferably by means of power thyristors in the following manner:

As soon as a double coil (for example, double coil 17 in FIG. 1) is disposed in the rear half of a tooth 14 and the following double coil (i.e., double coil 18 in FIG. 1) is disposed in the forward half of the adjoining tooth gap 15, both coils are energized by a pulse in such a manner that a maximum force in the drive direction (arrow S in FIG. 1) is attained. This pulse lasts for such length of time until the two double coils following one another (i.e., coils 17 and 18) are in alignment with a tooth 14.

At that instant the forwardly disposed double coil (17) is de-energized and the two double coils (18, 19) disposed therebehind are energized in the same manner as the two double coils (17, 18) were energized before. This operation continues cyclically so that the double coils are always cyclically energized sequentially in the following manner:

16, 17
17, 18
18, 19
19, 16
etc.

During braking, two double coils each, for example, 19, 18; 18, 17, 17, 16, 16, 19 have to be simultaneously and analogously energized at that instant when they are in alignment with the tooth 14. If the double coil 19 has left the operating range of the tooth 14, then it must be de-enerigzed and the coil 17 which in the meantime has come into alignment with the tooth 14, has to be energized.

The same cyclic operation takes place within the group-of-four 20, 21, 22 and 23.

In case a more uniform driving force at the primary part 12 is desired, the teeth may also have a trapezoidal profile.

The output of the linear reluctance motor according to the present invention can be increased to a very high value in that at each instant a larger number of teeth is used for the propulsion by the arrangement of a corresponding larger number of groups-of-four. The electric energy for the drive of the linear motor can be obtained by a gas generator driven by a gas turbine or also by a contact wire, such as, for example, an overhead line.

Figure 3:
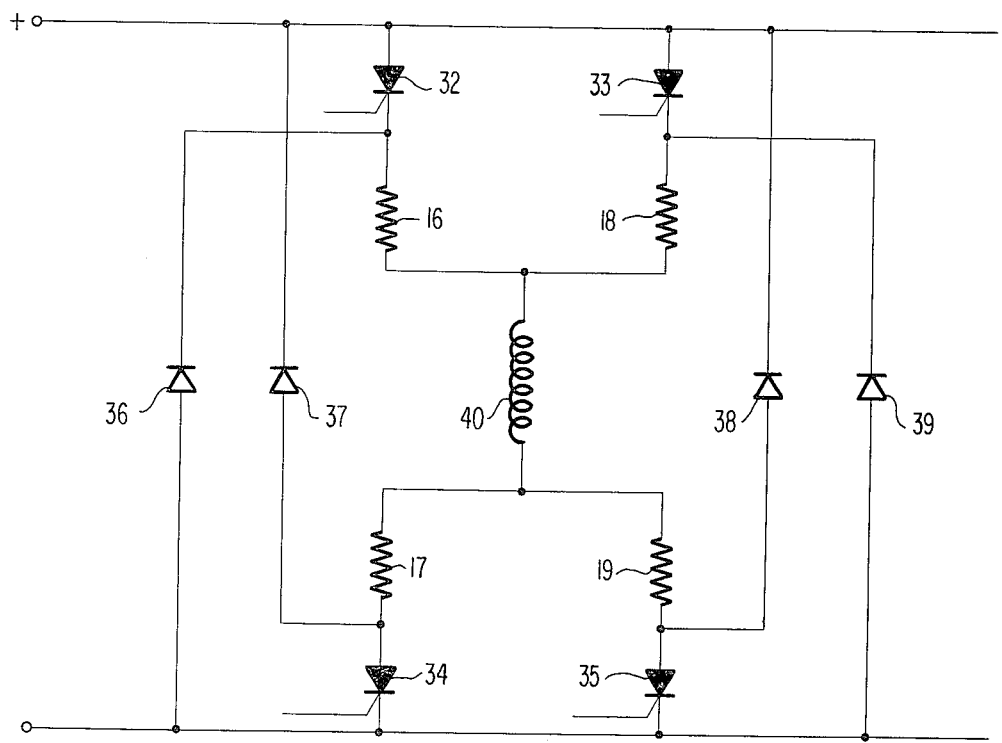
FIG. 3 is a circuit diagram showing the electric power system in the motor of the present invention.

The electric power system described in principle in FIG. 3 is controlled by a speed indicator or speedometer via a corresponding control system and makes possible the following functions: forward motion, reverse motion, speed control and electrical braking with recovery of the kinetic energy. A current limitation is obviously required for this.

The coils 16, 17, 18 and 19 according to the present application are shown in diagrammatical representation in FIG. 3. A smoothing choke coil 40 advantageously is connected in series with a shunt-resistance which controls the current and also controls an input of the electric control system 42, according to FIG. 4.

Figure 4:
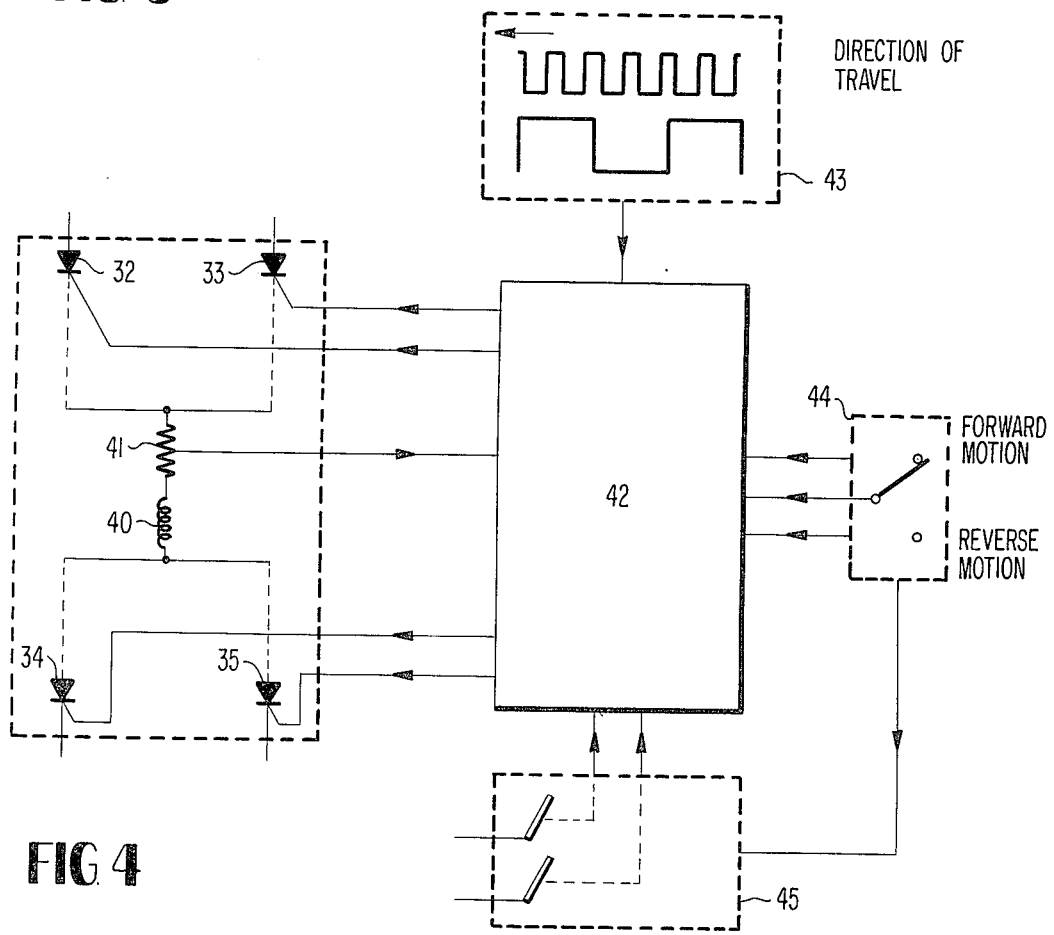
FIG. 4 is a schematic diagram showing the control system for the present invention.

The operations obtained by the present invention may be by a corresponding control of the main thyristors 32, 33, 34, 35 (see FIG. 4). The quenching of these thyristors takes place at the end of each period-of-four (one period corresponding to the space interval 1 toothwidth + 1 toothgap), while ignition via the regulator 45 can be engaged earlier or later (but at the earliest at the beginning of the period-of-four). In this way, the medium voltage supplied to the motor is varied and thus the speed or braking regulated.

The reset and ignition pulses are produced by the control system 42 which, in turn, receives signals or data from the speed and position indicator 43 regarding the speed of travel and the relative position of the primary and secondary part of the motor. This information is obtained by optical or magnetic means (not shown).

The direction of travel or the traction (motor or braking) are determined by means of direction of travel control elements 44. For the forward direction, the thyristors are ignited in the following sequence:

32, 34; 34, 33; 33, 35; 35, 32;

For the reverse direction, they are ignited in the following sequence:

35, 33; 33, 34; 34, 32; 32, 35;

If the vehicle moves, for example, in the forward direction and is to be electrically decelerated, ignition must take place in the reverse direction.

Correct functioning of the motor with electrical braking operation and starting with motor operation is only ensured if the electric control system makes it possible to limit the current. This means that the torque (or the amplitude of the currents flowing through the coils 16, 17, 18, 19) is kept constant at a specific value to be obtained from the travel program. For this purpose a shunt-resistance 41 which continually measures the motor current is connected in series with the choke 40. The voltage tapped at the terminals of this resistance is supplied to an electric control system 42. The ignition or excitation of the main thyristors is then such that the amplitude of the current remains constant.

With electrical braking it is desirable for a part of the kinetic energy of the decelerating vehicle to be converted into electrical energy and to be returned to the energy source via diodes 36, 37, 38 and 39 of the electric power system.

To this end, the motor operates as a generator and current limitation will be present.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. A linear electric motor for the drive of rail transporting means, which comprises a primary part including at least one group of four double coil means, each double coil means of said group arranged one adjacent the other, a magnetic yoke joining each double coil means, and means for simultaneously feeding each double coil means with an alternating current, said group of double coil means disposed in said rail transporting means longitudinally in the drive direction; a rail-like secondary part disposed fixedly on the ground and substantially parallel to track of said rail means, said secondary part including a toothed rack means having teeth of ferromagnetic material and tooth gaps, with substantially the same dimensions in the longitudinal direction, disposed along said toothed rack means in the longitudinal direction, wherein each said double coil means of said group is disposed with one coil oppositely positioned on either side of said rack means, the axis of each coil of said double coil means being in line with one another and perpendicular to said rack means, and wherein said group of four double coil means corresponds in its operating width to the longitudinal dimensions of one tooth and one tooth gap of said rack means; and means for energizing pulse-wise each said double coil means of said group successively such that a magnetic field is produced cyclically opposite the drive direction and cooperating with said toothed rack means, characterized in that the teeth and tooth gaps of the toothed rack means have substantially the same dimensions in the longitudinal direction, and in that two double coil means of the primary part correspond in their operating width to the longitudinal dimensions of a tooth or tooth gap.

2. A motor according to claim 1, characterized in that said energizing means includes control means for sequentially energizing two successive double coil means cyclically one after the other in such a manner that upon initiation of the energization of two double coil means disposed one behind the other, the forwardly disposed double coil means is within the area of the rear half of a tooth and the cyclically following double coil means is disposed in the forward half of the next tooth gap disposed therebehind whereas during the discontinuance of the energization the respective coil means are substantially aligned with a tooth.

3. A motor according to claim 1, characterized in that for purposes of braking two double coil means each are energized at that instant when they are in substantial alignment with a tooth.

4. A linear electric motor for the drive of rail transporting means, which comprises a primary part including at least one group of four double coil means, each double coil means of said group arranged one adjacent the other, a magnetic yoke joining each double coil means, and means for simultaneously feeding each double coil means with an alternating current, said group of double coil means disposed in said rail transporting means longitudinally in the drive direction; a rail-like secondary part disposed fixedly on the ground and substantially parallel to track of said rail means, said secondary part including a toothed rack means having teeth of ferromagnetic material and tooth gaps, with substantially the same dimensions in the longitudinal direction, disposed along said toothed rack means in the longitudinal direction, wherein each said double coil means of said group is disposed with one coil oppositely positioned on either side of said rack means, the axis of each coil of said double coil means being in line with one another and perpendicular to said rack means, and wherein said group of four double coil means corresponds in its operating width to the longitudinal dimensions of one tooth and one tooth gap of said rack means; and means for energizing pulse-wise each said double coil means of said group successively such that a magnetic field is produced cyclically opposite the drive direction and cooperating with said toothed rack means, characterized in that the teeth of the rack means are formed of laminated ferromagnetic members disposed substantially parallel to the double coil axis, and substantially parallel to the longitudinal direction of the toothed rack means, whereby each second magnetic member is constructed narrower in such manner that periodic recesses are present in the side surfaces of the toothed rack means opposite pole surfaces.

5. A motor according to claim 4, characterized in that non-ferromagnetic materials are interposed between the ferromagnetic members and thus the magnetic resistance of the teeth is increased.

6. A motor according to claim 4, characterized in that the teeth are made as separate structural parts and are mounted on a rail.

7. A motor according to claim 4, characterized in that the tooth thickness is selected to be sufficient in such a manner that the distance between a toothed rack side surface and a pole surface has a size sufficient for practical operation but is also sufficiently small for the production of the requisite driving force.

8. A motor according to claim 7, characterized in that control means for the coil energization includes high-power thyristor means and means for producing pulses including feeler means responding to the position of the primary part relative to the teeth of the rack means which controls the thyristor means and thus provides an automatic control.

9. A motor according to claim 8, characterized in that a brake circuit means is provided.

10. A motor according to claim 9, characterized in that the velocity control takes place by control of the pulse frequency.

11. A linear electric motor for the drive of rail transporting means, which comprises a primary part including at least one group of four double coil means, each double coil means of said group arranged one adjacent the other, a magnetic yoke joining each double coil means, and means for simultaneously feeding each double coil means with an alternating current, said group of double coil means disposed in said rail transporting means longitudinally in the drive direction; a rail-like secondary part disposed fixedly on the ground and substantially parallel to track of said rail means, said secondary part including a toothed rack means having teeth of ferromagnetic material and tooth gaps, with substantially the same dimensions in the longitudinal direction, disposed along said toothed rack means in the longitudinal direction, wherein each said double coil means of said group is disposed with one coil oppositely positioned on either side of said rack means, the axis of each coil of said double coil means being in line with one another and perpendicular to said rack means, and wherein said group of four double coil means corresponds in its operating width to the longitudinal dimensions of one tooth and one tooth gap of said rack means; and means for energizing pulse-wise each said double coil means of said group successively such that a magnetic field is produced cyclically opposite the drive direction and cooperating with said toothed rack means, characterized in that for use as an oscillator the toothed rack means has a limited length and forms said fixed secondary part and in that the primary part is movably arranged whereby the energization of the coil means is so controlled that a to and fro movement of the respective primary part is achieved within the length of the toothed rack means.

12. A linear electric motor for the drive of rail transporting means, which comprises a primary part including at least one group of four double coil means, each double coil means of said group arranged one adjacent the other, a magnetic yoke joining each double coil means, and means for simultaneously feeding each double coil means with an alternating current, said group of double coil means disposed in said rail transporting means longitudinally in the drive direction; a rail-like secondary part disposed fixedly on the ground and substantially parallel to track of said rail means, said secondary part including a toothed rack means having teeth of ferromagnetic material and tooth gaps, with substantially the same dimensions in the longitudinal direction, disposed along said toothed rack means in the longitudinal direction, wherein each said double coil means of said group is disposed with one coil oppositely positioned on either side of said rack means, the axis of each coil of said double coil means being in line with one another and perpendicular to said rack means, and wherein said group of four double coil means corresponds in its operating width to the longitudinal dimensions of one tooth and one tooth gap of said rack means; and means for energizing pulse-wise each said double coil means of said group successively such that a magnetic field is produced cyclically opposite the drive direction and cooperating with said toothed rack means, characterized in that said energizing means includes control means for sequentially energizing two successive double coil means cyclically one after the other in such a manner that upon initiation of the energization of two double coil means disposed one behind the other, the forwardly disposed double coil means is within the area of the rear half of a tooth and the cyclically following double coil means is disposed in the forward half of the next tooth gap disposed therebehind whereas during the discontinuance of the energization of the respective coil means are substantially aligned with a tooth.

13. A motor according to claim 12, characterized in that for purposes of braking two double coil means each are energized at that instant when they are in substantial alignment with a tooth.

14. A linear reluctance motor for driving rail transporting means, said linear reluctance motor comprising a primary part arranged on the rail transporting means and a rail-like secondary part arranged fixedly on the ground and substantially parallel to a track of the rail transporting means, wherein the primary part includes at least one section of adjacent coil means and energizing means for producing a traveling magnetic field from said coil means, said traveling magnetic field moving oppositely the drive direction of the rail transporting means, and wherein the secondary part is a linear rail having a plurality of adjacent projections made of magnetic material, which are in cooperative relationship with the at least one section of coil means, wherein the projections from the linear rail of the secondary part are laminated magnetic layers disposed in parallel to the direction of the magnetic field and in parallel to the longitudinal direction of the rail, and wherein alternate lamina project to a distance from the linear rail less than that of the adjacent lamina.

15. A linear reluctance motor for driving rail transporting means, said linear reluctance motor comprising a primary part arranged on the rail transporting means and a rail-like secondary part arranged fixedly on the ground and substantially parallel to a track of the rail transporting means, wherein the primary part includes at least one section of adjacent coil means and energizing means for producing a traveling magnetic field from said coil means, said traveling magnetic field moving oppositely the drive direction of the rail transporting means, and wherein the secondary part is a linear rail having a plurality of adjacent projections made of magnetic material, which are in cooperative relationship with the at least one section of coil means, wherein said at least one section of adjacent coil means includes at least two adjacent coil means arranged in the direction of said track, said at least one section of coil means including a quadruplet group of adjacent double coils, each of said double coils being disposed on opposite sides of said linear rail of the secondary part, and said double coils of said quadruplet group being adjacently arranged on said rail transporting means in the direction of the track, and wherein said energizing means include control means for controlling sequential excitation by said energizing means of each of said at least two adjacent coil means in a direction opposite to said drive direction, at least one of said plurality of projections electromagnetically cooperating with one of said at least two adjacent coil means, wherein said control means sequentially excite at least two respective adjacent ones of said double coils, the first of said two adjacent double coils being initially disposed in juxtaposition with a half portion of one of said plurality of adjacent projections of said secondary part, and the second of said two adjacent double coils being initially disposed in juxtaposition with a gap between said one projection and the next following projection of said plurality.

16. A linear reluctance motor according to claim 15, wherein the projections from the linear rail of the secondary part are laminated magnetic layers disposed in parallel to the direction of the magnetic field and in parallel to the longitudinal direction of the rail, and wherein alternate lamina project to a distance from the linear rail less than that of the adjacent lamina.

17. A linear reluctance motor according to claim 15, wherein said first of said two adjacent double coils is disposed juxtaposed to the rear half portion of said one projection in the drive direction.

18. A linear reluctance motor for driving rail transporting means, said linear reluctance motor comprising a primary part arranged on the rail transporting means and a rail-like secondary part arranged fixedly on the ground and substantially parallel to a track of the rail transporting means, wherein the primary part includes at least one section of adjacent coil means and energizing means for producing a traveling magnetic field from said coil means, said traveling magnetic field moving oppositely the drive direction of the rail transporting means, and wherein the secondary part is a linear rail having a plurality of adjacent projections made of magnetic material, which are in cooperative relationship with the at least one section of coil means, wherein said at least one section of adjacent coil means includes at least two adjacent coil means arranged in the direction of said track, said at least one section of coil means including a quadruplet group of adjacent double coils, each of said double coils being disposed on opposite sides of said linear rail of the secondary part, and said double coils of said quadruplet group being adjacently arranged on said rail transporting means in the direction of the track, and wherein said energizing means include control means for controlling sequential excitation by said energizing means of each of said at least two adjacent coil means in a direction opposite to said drive direction, at least one of said plurality of projections electromagnetically cooperating with one of said at least two adjacent coil means, wherein said control means sequentially excites a pair of said double coils in dependent sequence with a first of said pair to be excited being disposed in juxtaposition with a rear portion of one of said projections while the second of said pair to be excited being in juxtaposition with a gap between respective ones of said plurality of projections.

19. A linear reluctance motor according to claim 18, wherein a plurality of quadruplet groups of adjacent double coils are formed in electromagnetic cooperation with said secondary part.

20. A linear reluctance motor for driving rail transporting means, said linear reluctance motor comprising a primary part arranged on the rail transporting means and a rail-like secondary part arranged fixedly on the ground and substantially parallel to a track of the rail transporting means, wherein the primary part includes at least one section of adjacent coil means and energizing means for producing a traveling magnetic field from said coil means, said traveling magnetic field moving oppositely the drive direction of the rail transporting means, and wherein the secondary part is a linear rail having a plurality of adjacent projections made of magnetic material, which are in cooperative relationship with the at least one section of coil means, wherein said at least one section of adjacent coil means includes at least to adjacent coil means arranged in the direction of said track, said at least one section of coil means including a quadruplet group of adjacent double coils, each of said double coils being disposed on opposite sides of said linear rail of the secondary part, and said double coils of said quadruplet group being adjacently arranged on said rail transporting means in the direction of the track, and wherein said energizing means include control means for controlling sequential excitation by said energizing means of each of said at least two adjacent coil means in a direction opposite to said drive direction, at least one of said plurality of projections electromagnetically cooperating with one of said at least two adjacent coil means, wherein the projections from the linear rail of the secondary part are laminated magnetic layers disposed at least approximately in parallel to the axis of said double coils and at least approximately in parallel to the axis of said double coils and at least approximately in parallel to the longitudinal direction of the rail, and wherein adjacent lamina project from the linear rail at different distances such that alternate lamina have a smaller spacing from the double coils.

* * * * *